(12) United States Patent
Quang et al.

(10) Patent No.: US 7,707,504 B2
(45) Date of Patent: Apr. 27, 2010

(54) OFFLINE CONFIGURATION TOOL FOR SECURE STORE ADMINISTRATION

(75) Inventors: Pham D. Quang, Sofia (BG); Nina P. Petrova, Sofia (BG); Javor G. Stoimenov, Sofia (BG)

(73) Assignee: SAP AG, Walldorf (DE)

( * ) Notice: Subject to any disclaimer, the term of this patent is extended or adjusted under 35 U.S.C. 154(b) by 1313 days.

(21) Appl. No.: 10/856,077

(22) Filed: May 28, 2004

(65) Prior Publication Data
US 2005/0268080 A1 Dec. 1, 2005

(51) Int. Cl.
G06F 15/177 (2006.01)
(52) U.S. Cl. .................... 715/735; 715/734; 715/736; 709/232
(58) Field of Classification Search ......... 715/733–736; 713/1; 709/232
See application file for complete search history.

(56) References Cited

U.S. PATENT DOCUMENTS

| 6,523,027 | B1 * | 2/2003 | Underwood ............ 707/4 |
| 6,801,949 | B1 * | 10/2004 | Bruck et al. ........... 709/232 |
| 2003/0145101 | A1 * | 7/2003 | Mitchell et al. ........ 709/236 |

* cited by examiner

*Primary Examiner*—William L Bashore
*Assistant Examiner*—Sherrod Keaton
(74) *Attorney, Agent, or Firm*—Blakely Sokoloff Taylor & Zafman (57) ABSTRACT

A system and method are provided for a configuration tool to administer a secure store file. In an embodiment, a front-end layer of the configuration tool displays a visual representation of one or more properties stored in a secure store file. The configuration tool may receive input identifying one of the displayed properties. In an embodiment, the configuration tool uses a logical task to set a value for the selected property in a data layer of the configuration tool.

17 Claims, 9 Drawing Sheets

```
config.input.properties                    Properties File 336 install.dir=/usr/sap/C11/JC06/j2ee
servers.count=2 system.id=06
box.number=C11JC06p78124 dispatcher.heap.size=133
server.heap.size=1000 os.bit.length=32
os.unicode=yes
os.name=ntintel java.home=/java/jdk1.3.1_07 system.name=C11 secstorefs.lib=/usr/sap/C11/SYS/global/security/lib
secstorefs.keyfile=/usr/sap/C11/SYS/global/security/data/
SecStore.key
secstorefs.secfile=/usr/sap/C11/SYS/global/security/data/
SecStore.properties
rdbms.connection=jdbc/pool/C11
rdbms.driver=not_needed
rdbms.initial.connections=1
rdbms.driverLocation=/sapdb/programs/runtime/jar/sapdbc.jar
rdbms.maximum.connections=5 password.crypted=yes
admin.password=des19(AA|BB|CCC|DDD|)
guest.password=des19(AA|BB|CCC|DDD|)

enq.host=p78124
enq.port=3201
enq.profile.filename=/usr/sap/C11/SYS/profile/C11_JC06_p78124 ms.host=p78124
ms.port=3601 sysDS.maxTimeToWaitConnection=120
sysDS.driverClassName=not_needed
sysDS.SQLEngine=Open_SQL
sysDS.connectionLifetime=600
sysDS.dataSourceName=SAPC11DB
sysDS.maximumConnections=10
sysDS.initialConnections=1
sysDS.runCleanupThreadInterval=300
sysDS.aliases=SAP/BC_JMS,SAP/BC_UME,SAP/
BC_WDRR,SAP/BC_SLD,SAP/BC_UDDI,SAP/BC_XMLA console.log.dir=./log/console_logs
console.log.output.stream=yes
console.log.days.to.keep=7
console.log.error.stream=yes
```

405 → servers.count=2
410 → system.id=06
415 → box.number=C11JC06p78124
416 → secstorefs.keyfile
418 → secstorefs.secfile
420 → rdbms.*
425 → enq.*
430 → ms.*

```
<task name="Change.secstore">
  <property key="new.admin/user/C11" value="Administrator" />
  <property key="init.jdbc/pool/C11/ClassName"
    value="com.sap.dbtech.jdbc.DriverSapDB" />
  <property key="new.admin/password/C11" value="sap" />
  <property key="init.admin/user/C11" value="Administrator" />
  <property key="SAPSECFILE" value="C:\usr\sap\C11\SYS\global\
    security\data\SecStore.properties" />
  <property key="new.admin/port/C11" value="50004" />
  <property key="new.jdbc/pool/C11/Url" value="jdbc:sapdb://
    krasimira-k/C11?timeout=0&spaceoption=true" />
  <property key="new.jdbc/pool/C11/Password" value="sap" />
  <property key="init.jdbc/pool/C11/User" value="SAPC11DB" />
  <property key="new.jdbc/pool/C11/User" value="SAPC11DB" />
  <property key="new.admin/host/C11" value="krasimira-k" />
  <property key="init.admin/host/C11" value="krasimira-k" />
  <property key="new.demo" value="demo" />
  <property key="init.admin/password/C11" value="sap" />
  <property key="SAPSYSTEMNAME" value="C11" />
  <property key="init.jdbc/pool/C11/Url" value="jdbc:sapdb://
    krasimira-k/C11?timeout=0&spaceoption=true" />
  <property key="new.jdbc/pool/C11/ClassName"
    value="com.sap.dbtech.jdbc.DriverSapDB" />
  <property key="SAPKEYFILE" value="C:\usr\sap\C11\SYS\global\
    security\data\SecStore.key" />
  <property key="init.admin/port/C11" value="50004" />
  <property key="init.jdbc/pool/C11/Password" value="sap" />
</task>
```

600 → `<task name="Change.secstore">`
605 → `<property key="new.admin/user/C11" ...>`
610 → `<property key="new.admin/password/C11" ...>`
615 → `<property key="new.admin/port/C11" ...>`
625 → `<property key="new.jdbc/pool/C11/Url" ...>`
630 → `<property key="new.jdbc/pool/C11/Password" ...>`
640 → `<property key="new.jdbc/pool/C11/User" ...>`
620 → `<property key="new.admin/host/C11" ...>`
635 → `<property key="new.jdbc/pool/C11/ClassName" ...>`

OFFLINE CONFIGURATION TOOL FOR SECURE STORE ADMINISTRATION

TECHNICAL FIELD

Embodiments of the invention generally relate to the field of data processing systems and more particularly, to a system and method for an offline configuration tool for secure store administration.

BACKGROUND

Figure 1:
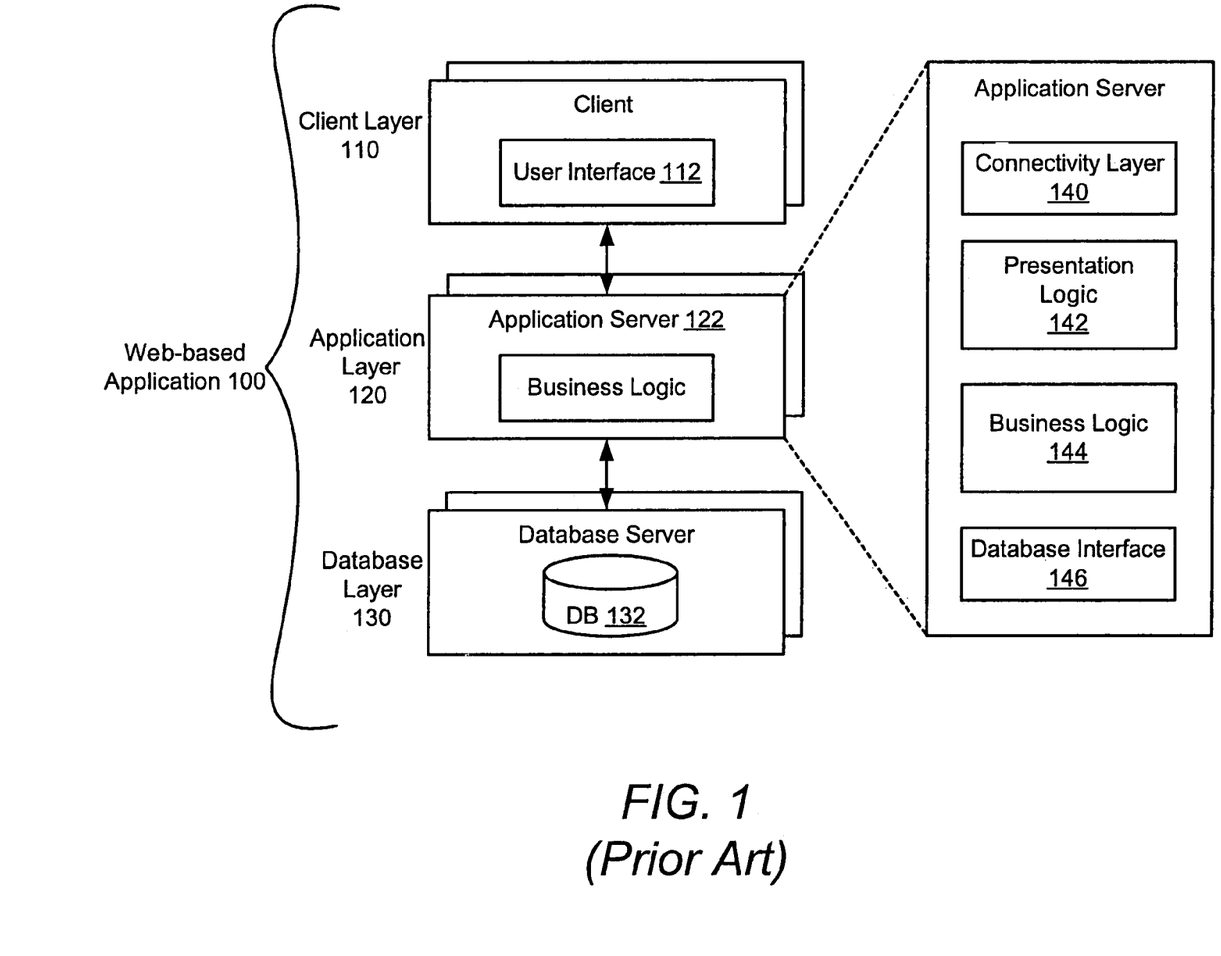
FIG. 1 is a block diagram of a Web-based application having a multi-tiered architecture.

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the HyperText Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Establishing a connection between application server 122 and database 132 is typically a two-part process: loading an appropriate driver and connecting to database 132 using the appropriate driver. Loading an appropriate driver is typically accomplished with a method call. For example, application server 122 may employ a Java Database Connectivity (JDBC) Application Program Interface (API) that complies with the Java 2 Platform, Standard Edition (J2SE), version 1.4.2, published June 2003 (the J2SE Standard). Loading an appropriate driver from the JDBC API may be done, for example, with the following line of code: Class.forName("jdbc.DriverXYZ").

The second part of the process is to connect to database 132 using the loaded driver. The following line of code illustrates connecting to database 132 using the loaded driver: connection con=DriverManager.getConnection ("address," "login," "password"). The terms "address," "login," and "password" illustrate connection information that is accessed by application server 122 to establish a connection to database 132.

In conventional systems, the connection information is stored as plain text in a file system and accessed, as needed, by application server 122. Storing connection information as plain text in a file system leads to potential security problems. For example, file systems are vulnerable to access by unauthorized users. Further, unauthorized users may readily comprehend the value of plain text connection information (e.g., plain text passwords, addresses, etc.) that is stored in a file system. Also, if the file system is connected to the application server by a network, then connection information may be vulnerable as it is communicated over the network.

SUMMARY OF THE INVENTION

A system and method are provided for a configuration tool to administer a secure store file. In an embodiment, a front-end layer of the configuration tool displays a visual representation of one or more properties stored in a secure store file. The configuration tool may receive input identifying one of the displayed properties. In an embodiment, the configuration tool uses a logical task to set a value for the identified property in a data layer of the configuration tool.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 is an illustration of a change secure store task, according to an embodiment of the invention.

DETAILED DESCRIPTION

A system and method are provided for a configuration tool to administer a secure store file. In an embodiment, a front-end layer of the configuration tool displays a visual representation of one or more properties stored in the secure store file. The configuration tool may receive input identifying one of the displayed properties. As is further described below, in an embodiment, the configuration tool uses a logical task to set a value for the selected property in a data layer of the configuration tool.

Figure 2:
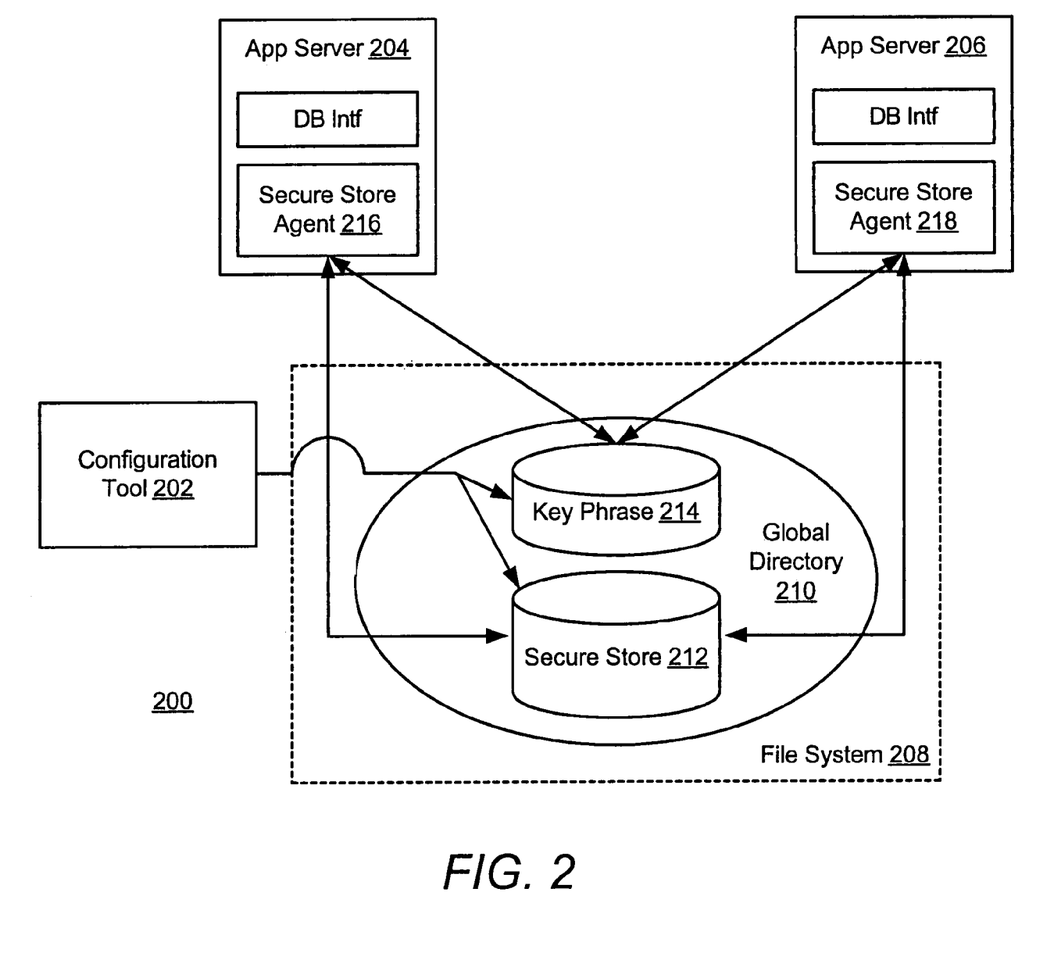
FIG. 2 is a block diagram of selected elements of a distributed system providing secure storage in the file system according to an embodiment of the invention.

FIG. 2 is a block diagram of selected elements of distributed system 200 providing secure storage in the file system according to an embodiment of the invention. Distributed system 200 includes configuration tool 202 and application servers 204 and 206. In an embodiment, configuration tool 202 and application servers 204 and 206 have access to file system 208. A "file system" is a system that an operating system or a program uses to organize and keep track of files. In an embodiment, files system 208 includes global directory 210. A directory refers to an organizational unit used to organize files into a structure, for example, a hierarchical structure. A global directory is a directory that may be accessed by more than one application server.

Global directory 210 includes secure store file 212. In an embodiment, secure store file 212 provides secure storage (e.g., encrypted) for selected information used by application servers 204 and 206 such as database connection information and administrative access information (e.g., an administrator username and/or password). Global directory 210 may also include key phrase file 214 having one or more encryption key phrases for decrypting (and/or encrypting) information stored in secure store file 212.

In an embodiment, processes executing on application servers 204, 206 may reference secure store agents 216, 218 to access selected information, instead of referencing, for example, plain text passwords. Secure store agents 216, 218 may obtain and decrypt the requested information from secure store file 212. For example, if a process executing on application server 204 requests a database connection, secure store agent 216 may obtain the database connection information from secure store file 212.

In an embodiment, the information stored in secure store file 212 is organized into one or more key-value property pairs. A property key may identify a property (e.g., a password) and a property value may specify a current value for the property. In an embodiment, configuration tool 202 administers secure store file 212. The administration of secure store file 212 may include tasks such as: inserting key-value property pairs; changing the value of key-value property pairs; deleting a key-value property pair; providing a list of key-value property pairs; encrypting secure store file 212, and the like.

Figure 3:
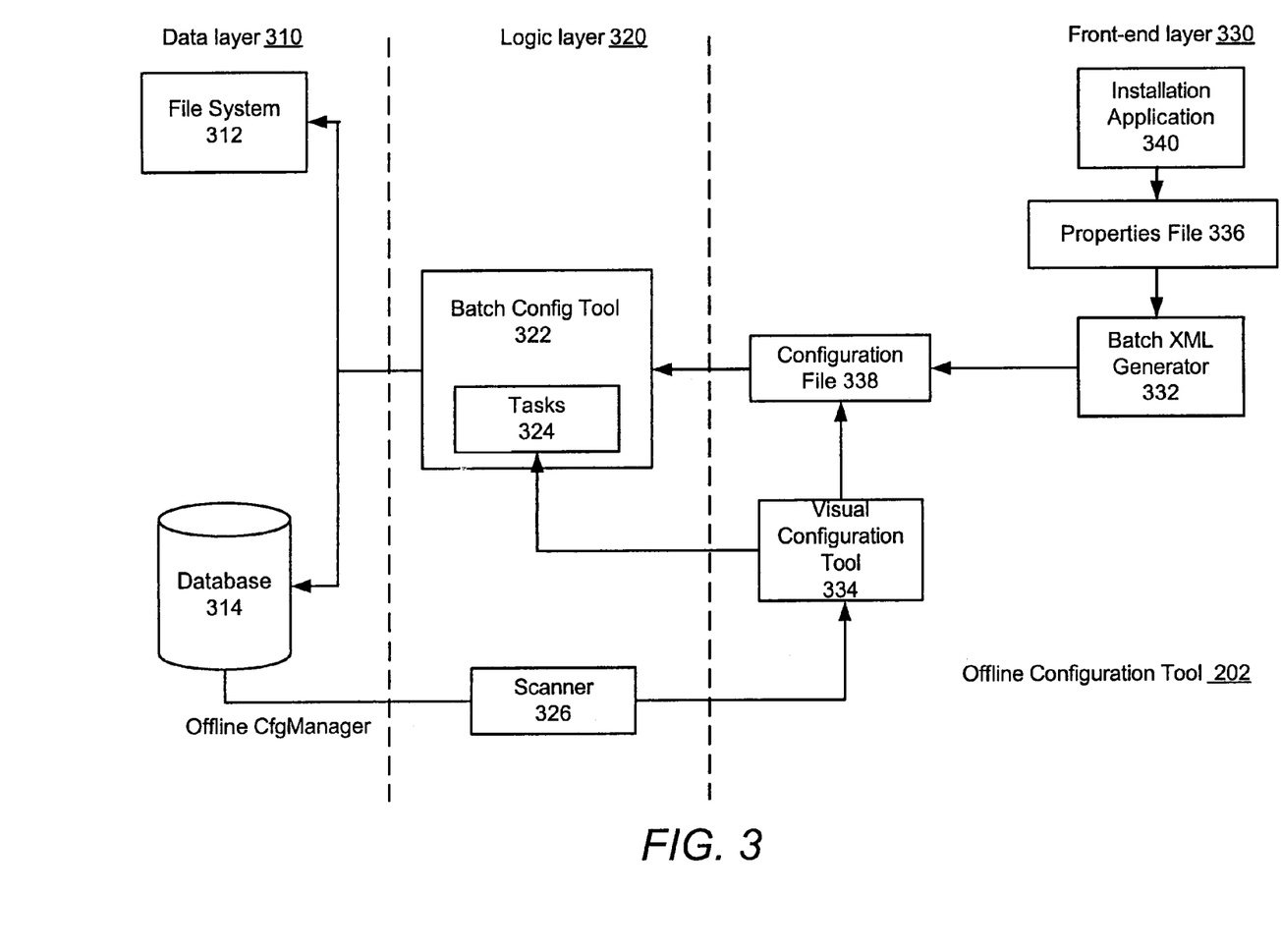
FIG. 3 is a block diagram of an offline configuration tool implemented according to an embodiment of the invention.

FIG. 3 is a block diagram of offline configuration tool 202 implemented according to an embodiment of the invention. In one embodiment, offline configuration tool 202 may, for example, administer a secure store file. Offline configuration tool 202 may be logically divided into data layer 310, logic layer 320, and front-end layer 330.

In the illustrated embodiment, data-layer 310 includes file system 312 and database 314. File system 312 stores data and programs for one or more communicatively coupled application servers. In one embodiment, file system 312 stores a secure store file (e.g., secure store file 212, shown in FIG. 2). File system 312 may include the system files for one or more communicatively coupled application servers. The term "system file" broadly refers to files that are part of an operating system and/or other control programs.

Database 314 is a persistent store for data and programs. In an embodiment, database 314 includes a Database Management System (DBMS) to control the persistently stored data including the overall organization of the data, retrieval of the data, and integrity of the data. As is further described below, database 314 may store configuration information for one or more communicatively coupled application servers.

Embodiments of the invention may be described with reference to a "cluster" of application servers. An application server cluster (or simply, cluster) broadly refers to a group of communicatively coupled application servers. The cluster may include one or more application server "instances," a central database (e.g., database 314) and central services. In an embodiment, an application server "instance" includes a group of redundant application servers and a dispatcher (cluster elements). The dispatcher distributes server requests to each of the redundant application servers based on the load of each of the servers. The instances may communicate with each other via a messaging service of the central services. Generally, the cluster elements share a central database (e.g., database 314). In an embodiment, the cluster may be centrally defined and configured in the central database. An example cluster architecture is further discussed below, with reference to FIG. 9.

Front-end layer 330 provides an interface between offline communication tool 202 and, for example, an end-user and/or another system (e.g., an installation application). In the illustrated embodiment, front-end layer 330 includes batch markup language generator 332 and visual configuration tool 334. In addition, front-end layer 330 may also include a console to provide a text-based interface. As is further described below, batch markup language generator 332 and visual configuration tool 334 receive input (e.g., from installation application 340 or an end-user) and produce configuration file 338 based on the received input.

Batch markup language generator 332 is coupled with installation application 340 via, for example, a network. In an embodiment, installation application 340 provides properties file 336 to batch markup language generator 332. In one embodiment, installation application 340 is a software program that installs cluster elements (e.g., database 314, a dispatcher, and one or more application servers).

Figure 4:
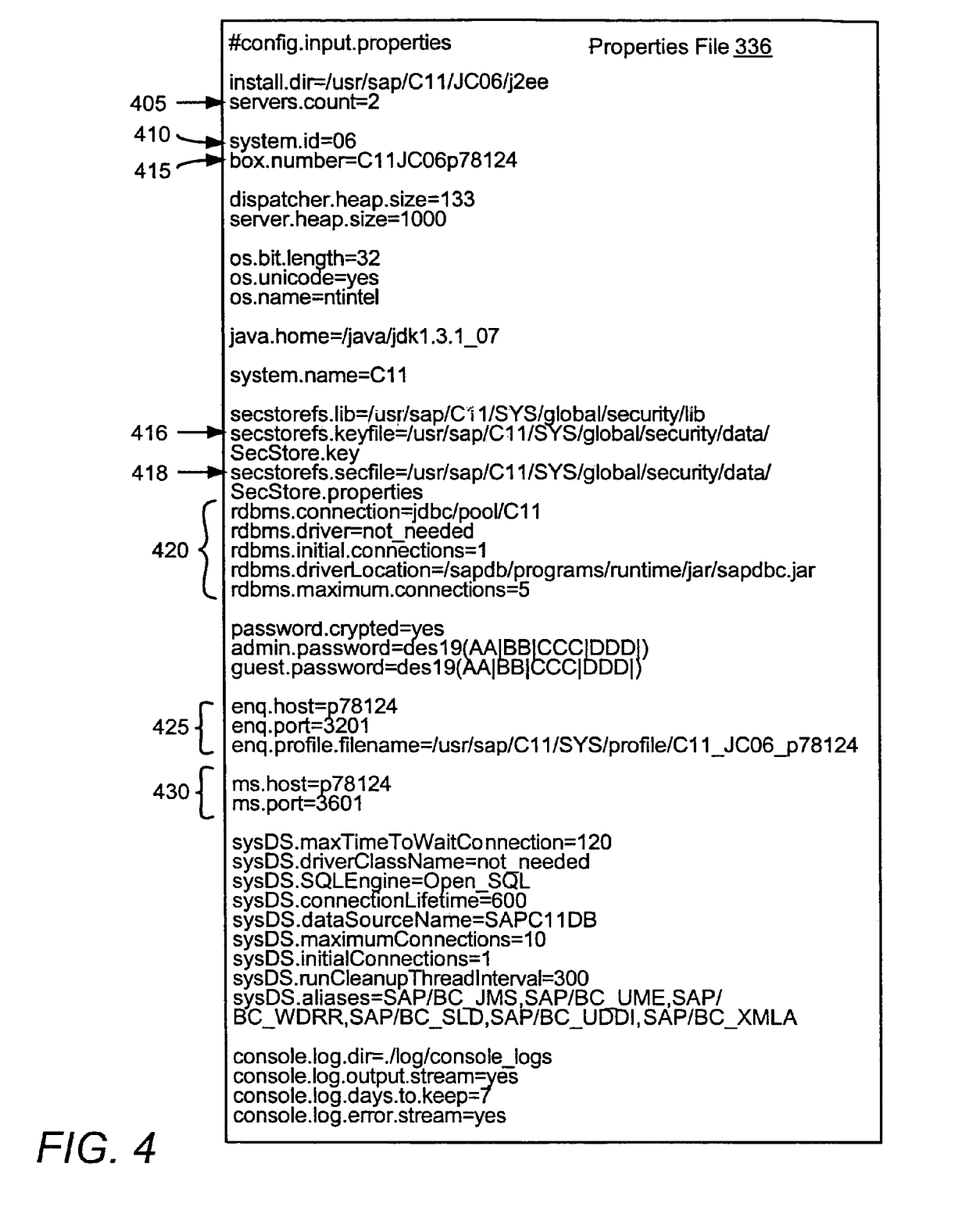
FIG. 4 is an illustration of selected elements of a properties file, according to an embodiment of the invention.

In an embodiment, properties file 336 provides initial configuration information for cluster installation. FIG. 4 is an illustration of selected elements of properties file 336, according to an embodiment of the invention. In the illustrated embodiment, the configuration information within properties file 336 is organized into key-value pairs. Each key specifies a configuration parameter and each value specifies a value for the configuration parameter.

In an embodiment, the specified configuration parameters define an initial configuration of a cluster. For example, key-value pair 405 specifies that, initially, the cluster has two application servers. Key-value pair 410 specifies that the system identifier is "06." In an embodiment, the system identifier identifies the cluster. Key-value pair 415 specifies a box number for the cluster. The box number is an identifier that specifies a physical machine on which one or more cluster elements are installed. In an embodiment, the box number may also identify, for example, a system name (e.g., C11), an instance number, and/or whether the instance is a central instance (e.g., JC00) or a dialog instance (e.g., J00).

In an embodiment, properties file 336 includes one or more properties for a secure store file. For example, key-value pair 416 specifies the location of the key phrase file (e.g., key phrase file 214, shown in FIG. 2). Similarly, key-value pair 418 specifies where in the global directory the secure store file (e.g., secure store file 212, shown in FIG. 2) is located. In an alternative embodiment of the invention, properties file 236 may include more secure store properties, fewer secure store properties, and/or different secure store properties.

Figure 9:
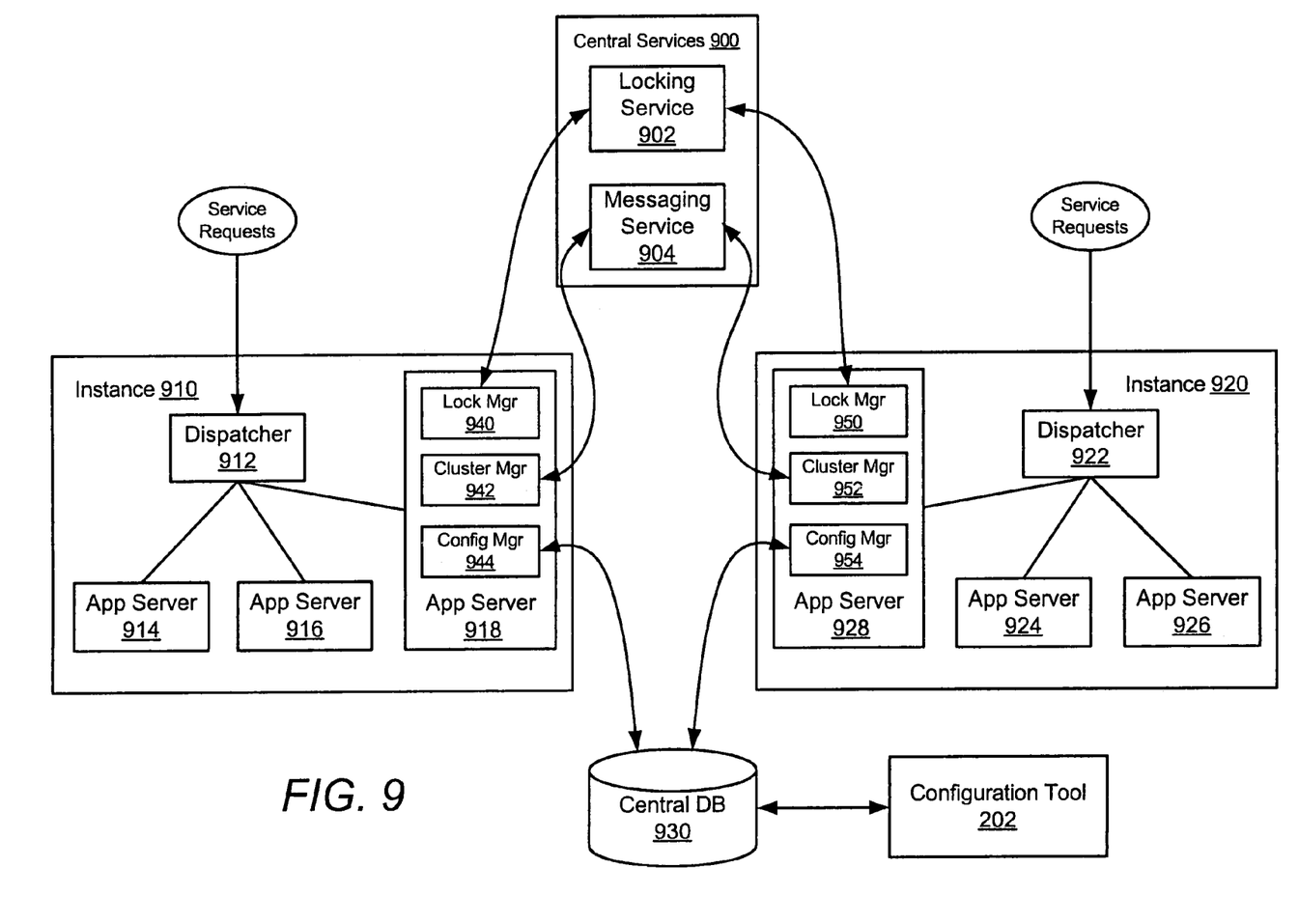
FIG. 9 is an illustration of an application server architecture employed in one embodiment of the invention.

In an embodiment, properties file 336 also provides configuration parameters for a database (e.g., database 314), a locking service (e.g., locking service 902, shown in FIG. 9), and/or a message server (e.g., messaging service 904, shown in FIG. 9). For example, key-value pairs 420 specify database connection information. Similarly, key-value pairs 425 specify a host and port number for the locking service and key-value pairs 430 specify a host and port number for the messaging service. The locking service and messaging service are further discussed below with reference to FIG. 9.

Referring again to FIG. 3, batch markup language generator 332 uses the information in properties file 336 to generate configuration file 338. In an embodiment, configuration file 338 is a markup language file that provides tasks 324 for logic layer 320. As is further discussed below, configuration file 338 may also be generated by visual configuration tool 334.

In one embodiment, configuration file 338 is an eXtensible Markup Language (XML) file. An XML file refers to a file implemented according to any of the XML standards, for example, the XML standard promulgated by the World Wide Web Consortium (W3C) entitled, "Extensible Markup Language (XML) 1.0 (Second Edition)," 6 Oct. 2000 (hereinafter, the XML Standard).

Figure 5:
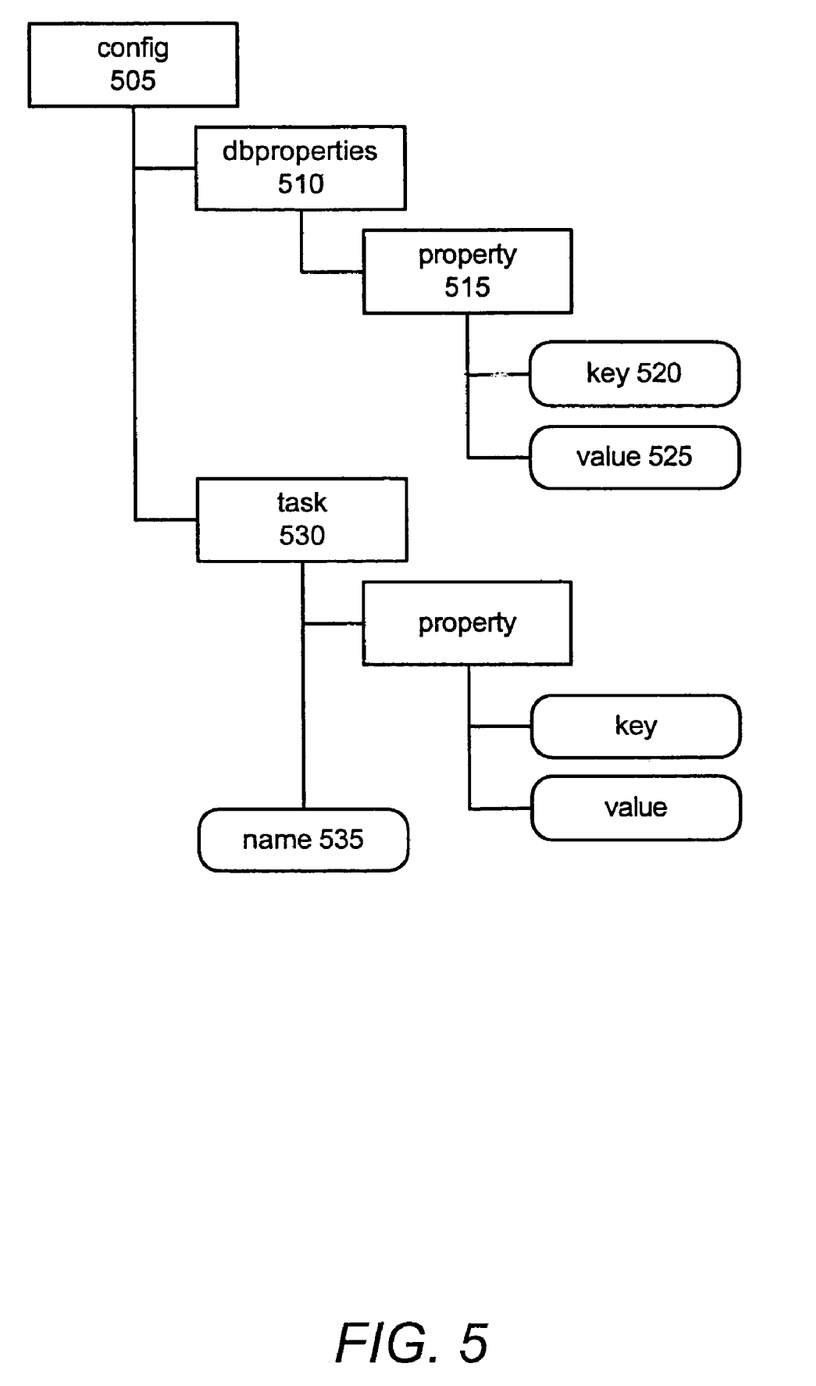
FIG. 5 is an illustration of a document type definition for a configuration file according to an embodiment of the invention.

In an embodiment, the structure of configuration file 338 is based on a predetermined format such as a Document Type Definition (DTD). FIG. 5 is an illustration of a DTD for configuration file 338 according to an embodiment of the invention. In the illustrated embodiment, config element 505 is the root element of configuration file 338. In an embodiment, config element 505 contains information for connecting to a database (e.g., database 314, shown in FIG. 3) and also one or more tasks to configure an application server (or an entire cluster of application servers) that is (or are) defined on the database.

In the illustrated embodiment, dbproperties element 510 contains the properties for connecting to the database. The properties may be organized as key-value pairs. Property element 515 specifies a property for connecting to the database in key 520 and corresponding value 525. Key element 520 identifies a property and value element 525 specifies a value for the identified property. The following code snippet is an example of dbproperties element 510. The code snippet illustrates that, in an embodiment, the properties for connecting to a database include a reference to a key phrase file named "secstorefs.keyfile" and a secure store file named "secstorefs.secfile." In an alternative embodiment the key phrase file and/or the secure store file may have different names and/or may be stored in different locations (e.g., different directories).

```
- <config>
    - <dbproperties>
        <property key="rdbms.maximum_connections" value="5" />
        <property key="system.name" value="C11" />
        <property key="secstorefs.keyfile"
            value="D:\usr\sap\C11\SYS\global\security\
            data\SecStore.key"/>
        <property key="secstorefs.secfile"
            value="D:\usr\sap\C11\SYS\global\security\
            data\SecStore.properties" />
        <property key="secstorefs.lib"
            value="D:\usr\sap\C11\SYS\global\security\lib" />
        <property key="rdbms.driverLocation"
            value="/sapdb/programs/runtime/jar/sapdbc.jar" />
        <property key="rdbms.connection" value="jdbc/pool/C11" />
        <property key="rdbms.initial_connections" value="1" />
```

In an embodiment, task element 530 contains one or more properties for configuring a cluster of application servers or a portion of a cluster of application servers. The task defined by task element 530 may be executed against database 314 (e.g., a database task) or file system 312 (e.g., a file task). For example, database tasks may include a task to create a new cluster element (e.g., a new application server) or a task to change the properties of a cluster element. File system tasks may include, for example, a task to configure one or more secure store properties. In one embodiment, name attribute 535 specifies a name for the task (e.g., create.new.element, as shown below).

The following is a code snippet that illustrates an example of task element 430 that implements a create new element task.

```
- <task name="create.new.element">
    <property key="box.number" value="C11JC06p78124" />
    <property key="secstorefs.lib"
        value="D:\usr\sap\C11\SYS\global\security\lib" />
    <property key="rdbms.driverLocation"
        value="/sapdb/programs/runtime/jar/sapdbc.jar" />
    <property key="os.unicode" value="yes" />
    <property key="rdbms.connection" value="jdbc/pool/C11" />
    <property key="rdbms.initial_connections" value="1" />
    <property key="os.name" value="ntintel" />
    <property key="secstorefs.keyfile"
        value="D:\usr\sap\C11\SYS\global\security\data\SecStore.key"
        />
    <property key="type" value="dispatcher" />
    <property key="secstorefs.secfile"
        value="D:\usr\sap\C11\SYS\global\security\
        data\SecStore.properties" />
    <property key="rdbms.maximum_connections" value="5" />
    <property key="os.bit.length" value="32" />
    <property key="system.name" value="C11" />
    <property key="r3.environment" value="no" />
    <property key="system.id" value="6" />
</task>
```

The code snippet illustrates that task element 530 may be based, at least in part, on the information provided in properties file 336. For example, the first property provided by the task is box number 415 and the last property provided by the task is system identifier 410. As is further described below, with reference to FIGS. 6-7, tasks generated by visual configuration tool 334 may include information provided by an end-user (e.g., an administrator and/or a developer) rather than information from properties file 336.

Referring again to FIG. 3, batch configuration tool 322 receives tasks 324 from configuration file 338 and/or visual configuration tool 334. In an embodiment, batch configuration tool 322 executes received tasks 324 against database 314 and/or file system 312. In one embodiment, batch configuration tool 322 may store one or more tasks 324 until receiving an indication from, for example, visual configuration tool 334 to execute a "batch" of tasks 324.

In an embodiment, visual configuration tool 334 provides a graphical user interface (GUI) for offline configuration tool 202. As is further discussed below with reference to FIGS. 6-7, visual configuration tool 334 may provide an interface to administer a secure store file (e.g., secure store file 212, shown in FIG. 2). In one embodiment, the GUI provided by visual configuration tool 334 is a swing-based GUI. A Swing-based GUI refers to a GUI that is based on the Swing API provided by, for example, the Java 2 Platform, Standard Edition, Specification, 1.4.2, Nov. 20, 2003.

In an embodiment, visual configuration tool 334 may be used to administer a secure store file (e.g., secure store file 212, show in FIG. 2). In one embodiment in which the secure store file is located in the file system (e.g., file system 208, shown in FIG. 2), visual configuration tool 334 issues file system tasks to administer the secure store file. In such an embodiment, visual configuration tool 334 may be referred to as an "offline" tool because the application server (or the cluster) need not be running when the secure store file is administered.

In an embodiment, visual configuration tool 334 uses scanner 326 to scan application server (or cluster) configuration information that is stored on database 314. Visual configuration tool 334 may receive, parse, and display the configuration information. In an embodiment in which database 314 contains configuration information for a cluster, the cluster elements may be displayed as a hierarchical tree structure.

In an embodiment, visual configuration tool 334 provides a GUI so that an end-user can provide input indicating a desire to, e.g., administer the secure store file. Visual configuration tool 334 receives the provided input and generates configuration file 338. For example, if a user provided input indicating a desire to change a number of properties stored in the secure store file, visual configuration tool 334 might generate a change secure store file task.

FIG. 6 is an illustration of change secure store task 600, according to an embodiment of the invention. Task 600 includes a number of key-value pair elements to set a corresponding number of properties that are stored in a secure store file. Key-value property pairs 605-620 set a number of system administrator properties. For example, key-value property pair 605 sets an administrator username to "Administrator" and key-value property pair 610 sets an administrator password to "sap." Similarly, key-value property pair 615 sets an administrator port number to "50004" and key-value property pair 620 sets the name of the administrator host node to "krasimira-k." In an embodiment, a system administrator may use these properties to access a system such as a cluster of application servers.

Key-value property pairs 625-640 set a number of database connection properties. For example, key-value pair 625 specifies a Uniform Resource Locator (URL) for a database and key-value pair 630 sets a password for accessing the database to "sap." Similarly, key-value pair 635 specifies a JDBC driver for accessing the database and key-value pair 640 specifies a system username for accessing the database.

In an embodiment, programs that desire a connection to the database provide a cluster identifier (or other system identifier) to a secure store agent (e.g., secure store agent 216, shown in FIG. 2). The secure store agent may access the secure store file (e.g., secure store file 212, shown in FIG. 2) and provide the database connection properties to the requesting program.

Figure 7:
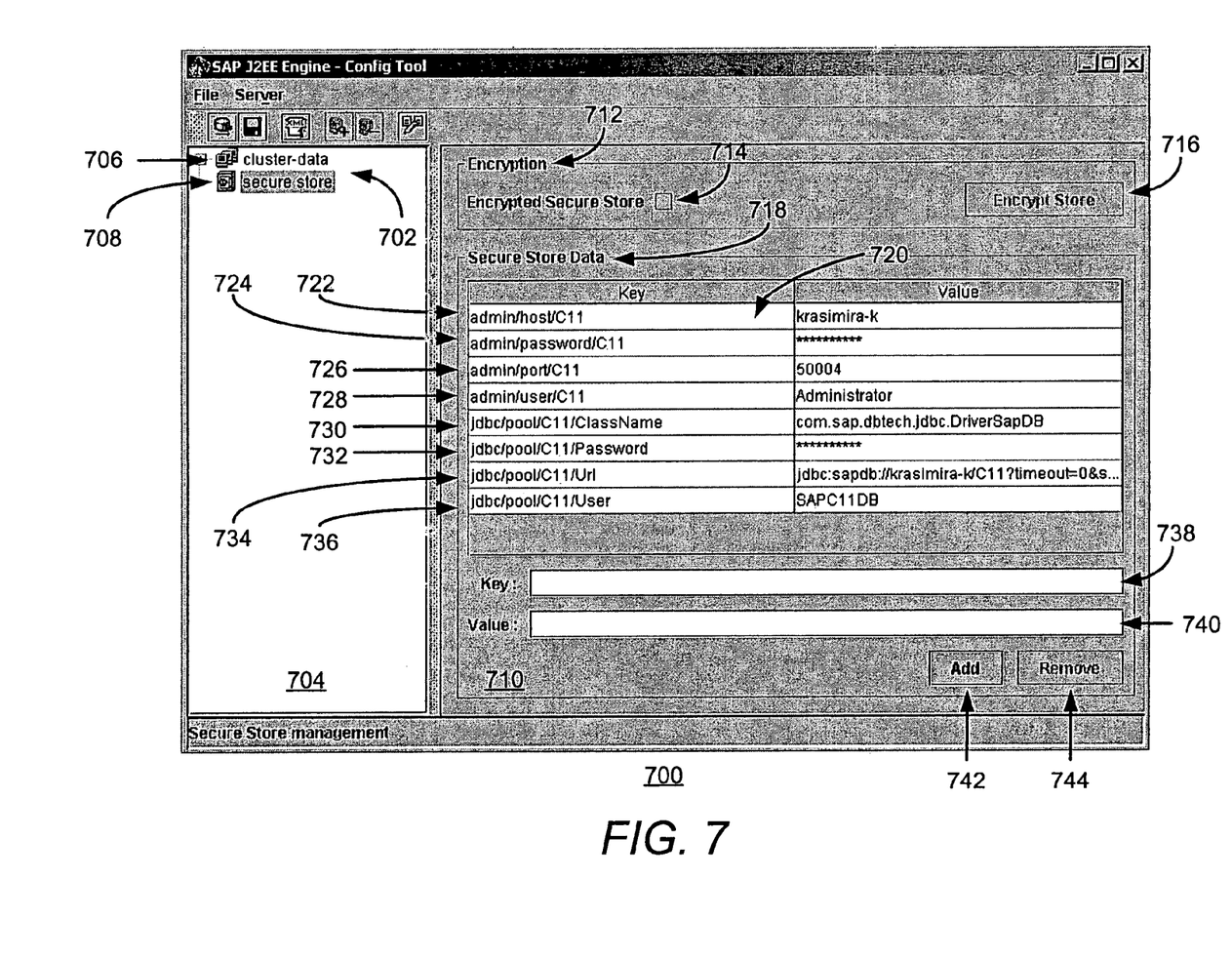
FIG. 7 illustrates an exemplary Graphical User Interface (GUI) provided by a visual configuration tool to administer a secure store file, according to an embodiment of the invention.

FIG. 7 illustrates an exemplary Graphical User Interface (GUI) 700 provided by visual configuration tool 334 to administer a secure store file, according to an embodiment of the invention. Tree structure 702 is displayed in pane 704 of GUI 700. In an embodiment, tree structure 702 represents the current configuration of a cluster. Root element 706 represents the cluster. Secure store element 768 represents a secure store file (e.g., secure store file 212, show in FIG. 2) that provides a secure store for various cluster elements.

In the illustrated embodiment, panel 710 is displayed in response to selecting secure store element 708 in tree structure 702. In one embodiment, encryption section 712 provides one or more administrative options for encrypting the secure store file. For example, encrypted secure store selection box 714 indicates the secure store file is encrypted when it is selected. In an embodiment, the secure store file may be selectively encrypted using an encryption tool such as the Java Cryptography Extension (JCE) cryptographic toolkit provided by the Institute for Applied Information Processing and Communications, Graz University of Technology (IAIK). In such an embodiment, encrypt store button 716 enables an administrator to selectively encrypt the secure store file.

In an embodiment, secure store data section 718 contains information about data that is stored in the secure store file. In an embodiment, the secure store file contains one or more properties such as database access properties and/or administrator access properties. These properties may be stored as key-value property pairs in which a property key identifies a property and a property value specifies a current value for the specified property. In the illustrated embodiment, the key-value property pairs are presented in table 720.

In an embodiment, key-value property pairs 722-728 provide a number of system administrator properties. For example, key-value property pair 722 indicates that the name of the administrator host node is "krasimira-k" and key-value property pair 724 indicates the current administer password. In the illustrated embodiment, the administer password is masked to prevent unauthorized viewers from reading it. Similarly, key-value property pair 726 indicates that the administrator port number is "50004" and key-value property pair 728 indicates that the administrator username is "Administrator."

In an embodiment, key-value property pairs 730-736 provide a number of database connection properties. For example, key-value property pair 730 provides the class name for the JDBC driver that may be used to connect to the database and key-value property pair 732 provides a password for connecting to the database. Similarly, key-value property pair 734 indicates a URL for connecting to the database and key-value property pair 736 indicates a system user name for accessing the database.

In one embodiment key field 738 and property field 740 provide a mechanism for changing a value of a key-value property pair, adding a new key-value property pair, and/or removing a key-value property pair. For example, an end-user may provide a key for field 738 or select one of the keys shown in table 720. The end-user may then provide a value for the provided (or selected) key in field 740. In one embodiment, the end-user adds a new key-value property pair by selecting add button 742 after providing a value for the key in field 740. Similarly, an end-user may remove a key-value property pair from table 720 by selecting remove button 744.

Figure 8:
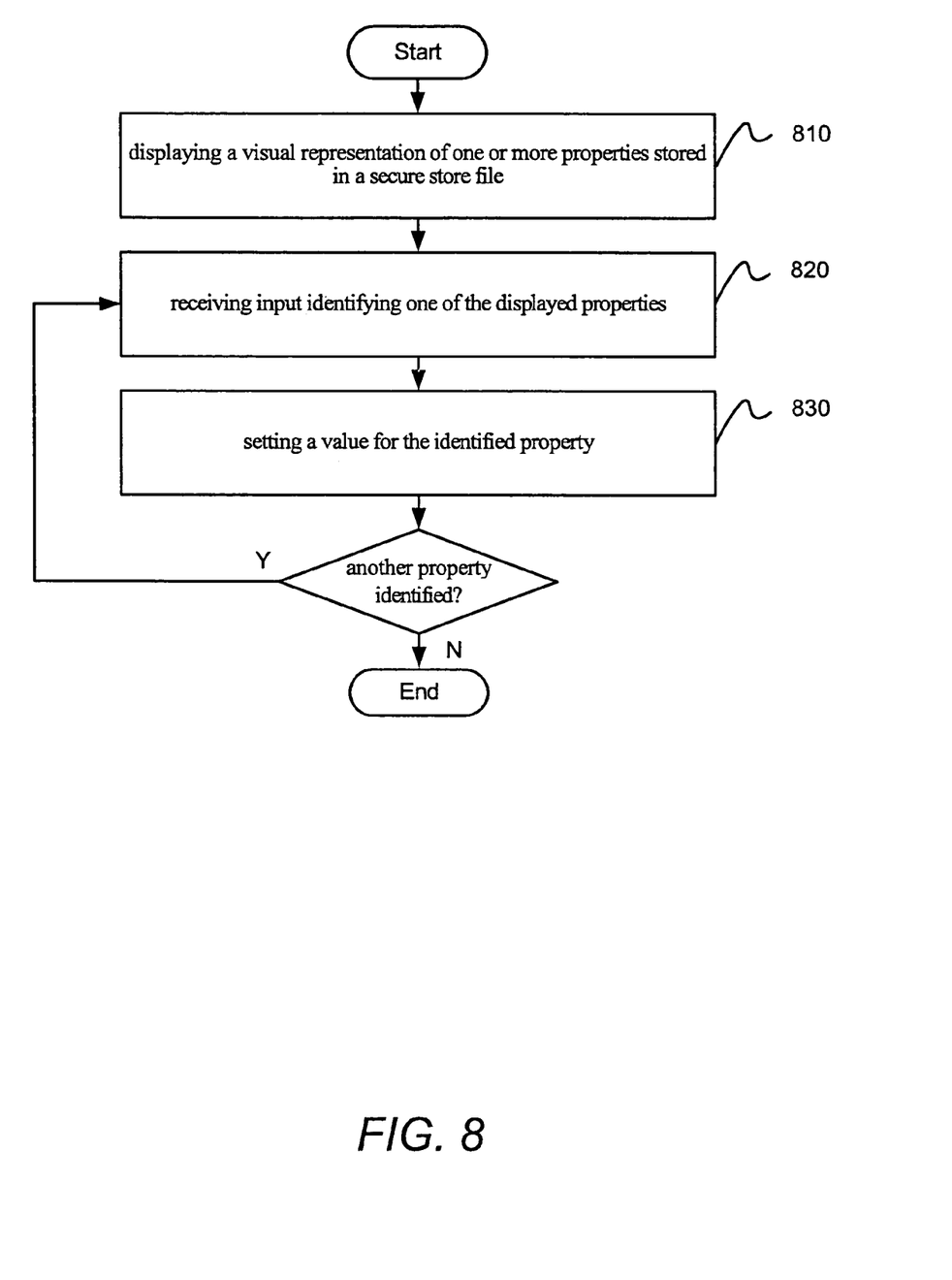
FIG. 8 is a flow diagram illustrating certain aspects of a method for administering a secure store file with a configuration tool.

Turning now to FIG. 8, the particular methods associated with embodiments of the invention are described in terms of computer software and hardware with reference to a flowchart. The methods to be performed by a configuration tool may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for administering a secure store file with a configuration tool (e.g., configuration tool 202, shown in FIG. 2). Referring to process block 810, a visual representation of one or more properties stored in a secure store file is displayed. In one embodiment, the visual representation is displayed in a front-end layer of the configuration tool. For example, the visual representation may be displayed in a visual configuration tool (e.g., visual configuration tool 334, shown in FIG. 3). In an embodiment, the one or more properties are displayed in a table (e.g., table 720, shown in FIG. 7).

In one embodiment, the secure store file represents a secure store of a cluster of application servers. In such an embodiment, the visual configuration tool may display a hierarchal tree structure having one or more tree nodes each of which represent a resource of the cluster. One of the tree nodes may represent the secure store file. In such an embodiment, the visual representation of the properties stored in the secure store file may be displayed in response to selecting the secure store tree node (e.g., via a cursor control device).

Referring to process block 820, the configuration tool receives input identifying one of the displayed properties. The term "receiving input" broadly refers to receiving an indication from a cursor control device, keyboard, touch screen, and the like. The term "identifying" one of the displayed properties broadly refers to selecting a property, naming a property, "touching" a property, and the like.

Referring to process block 830, the configuration tool sets a value for the identified property. In an embodiment, a logical task (e.g., task 600, shown in FIG. 6) is used to set the value of the identified property. The logical task may include a key-value property pair. The key property of the key-value property pair may correspond to the identified property. The value property may specify a new value for the identified property.

In an embodiment, the task may set a database connection property (e.g., a database URL and/or a database password). In one embodiment, the task may set an administrator property (e.g., an administrator password and/or username). In an alternative embodiment, the configuration tool may include more tasks, fewer tasks, and/or different tasks.

An application server architecture employed in one embodiment of the invention is illustrated in FIG. 9. The architecture includes central services "instance" 900 and a plurality of application server "instances" 910, 920. As used herein, application server instances, 910 and 920, each include a group of server nodes 914, 916, 918 and 924, 926, 928, respectively, and a dispatcher, 912, 922, respectively. Central services instance 900 includes locking service 902 and messaging service 904 (described below). The combination of all of the application instances 910, 920 and central services instance 900 is referred to herein as a "cluster." Although the following description will focus solely on instance 910 for the purpose of explanation, the same principles apply to other instances such as instance 920.

Server nodes 914, 916, 918 within instance 910 provide the business and/or presentation logic for the network applications supported by the system. Each of the server nodes 914, 916, 918 within a particular instance 910 may be configured with a redundant set of application logic and associated data. In one embodiment, dispatcher 912 distributes service requests from clients to one or more of server nodes 914, 916, 918 based on the load on each of the servers. For example, in one embodiment, a dispatcher implements a round-robin policy of distributing service requests (although various alternate load balancing techniques may be employed).

In one embodiment of the invention, server nodes 914, 916, 918 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of instances 910 and 920 is enabled via central services instance 900. As illustrated in FIG. 9, central services instance 900 includes messaging service 904 and locking service 902. Message service 904 allows each of the servers within each of the instances to communicate with one another via a message passing protocol. For example, messages from one server may be broadcast to all other servers within the cluster via messaging service 904. In addition, messages may be addressed directly to specific servers within the cluster (e.g., rather than being broadcast to all servers).

In one embodiment, locking service 902 disables access to (i.e., locks) certain specified portions of configuration data and/or program code stored within a central database 930. Locking managers 940 and 950 employed within the server nodes lock data on behalf of various system components which need to synchronize access to specific types of data and program code (e.g., such as the configuration managers 944 and 954).

In one embodiment, messaging service 904 and locking service 902 are each implemented on dedicated servers. However, messaging service 904 and the locking service 902 may be implemented on a single server or across multiple servers while still complying with the underlying principles of the invention.

As illustrated in FIG. 9, each server node (e.g., 918, 928) includes a lock manager 940, 950 for communicating with locking service 902; a cluster manager 942, 952 for communicating with messaging service 904; and a configuration manager 944, 954 for communicating with central database 930 (e.g., to store/retrieve configuration data). Although lock managers 940 and 950, cluster managers 942 and 952, and configuration managers 944 and 954 are illustrated with respect to particular server nodes, 918 and 928, in FIG. 9, each of the server nodes 914, 916, 924 and 926 and/or on the dispatchers 912, 922 may be equipped with equivalent lock managers, cluster managers and configuration managers.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the present invention may be downloaded as a computer program which may be transferred from a remote computer (e.g., a server) to a requesting computer (e.g., a client) by way of a propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method employed within a network comprising:
   operating a web-based application having a multi-tiered architecture including an application layer and a database layer, the application layer including a plurality of application server instances, the database layer including:
      a database server having a database to store cluster configuration information providing a central definition of a cluster including the database and the plurality of application server instances, and
      a secure store file to store one or more database connection parameters; for each of the plurality of application server instances,
      the application server instance retrieving a respective database connection parameter in the secure store file, and
      the application server instance connecting to the database based on the retrieved respective database connection parameter;
   with a display, displaying in a front-end layer of a configuration tool a hierarchical visual representation of the cluster configuration information and a respective connection parameter of one of the application server instances stored in the secure store file;
   receiving via the front-end layer of the configuration tool input identifying the displayed connection parameter and the displayed cluster configuration information;
   in response to the received input, providing a batch of tasks to a logic layer of the configuration tool, including providing a key-value pair corresponding to the identified connection parameter and a second key-value pair corresponding to the identified configuration information, the first key-value pair including a parameter key to identify the identified connection parameter and a parameter value to specify a value of the identified connection parameter;
   the logic layer of the configuration tool performing the provided batch of tasks, including
      setting a value in the secure store file for the identified connection parameter, and
      setting a value in the database for the identified configuration information; and
   wherein the configuration tool is an offline configuration tool configured to operate while the one or more application server instances are not running.

2. The method of claim 1, wherein displaying a visual representation of the connection parameter comprises:
   displaying the connection parameter in a table, the table having a key column listing one or more parameter keys, each parameter key to identify a connection parameter and a value column listing one or more parameter values, each parameter value to specify a current value for a connection parameter.

3. The method of claim 1, wherein receiving input identifying the displayed connection parameters comprises:
   receiving input identifying one of the displayed connection parameters from a cursor control device.

4. The method of claim 1, wherein displaying the hierarchical visual representation includes displaying a hierarchical tree structure having one or more tree nodes, each of the one or more tree nodes representing a resource of the plurality of application servers, wherein at least one of the tree nodes represents the secure store file, the method further comprising:
   receiving input identifying the displayed secure store tree node.

5. The method of claim 4, wherein displaying the hierarchical visual representation comprises:
   displaying a hierarchical visual representation of one or more connection parameters responsive to receiving input identifying the displayed secure store tree node.

6. The method of claim 5, wherein the displayed connection parameters include at least one of:
   a database Uniform Resource Locator (URL) property specifying a URL for connecting to a database; and
   a database password property specifying a password for connecting to the database.

7. The method of claim 6, wherein setting the value for the identified connection parameter comprises:
   setting the database URL property.

8. The method of claim 6, wherein setting the value for the identified connection parameter comprises:
   setting the database password property.

9. A configuration tool for administering a secure store file, the configuration tool comprising:
   a memory device in a database layer of a multi-tiered web application architecture including an application layer to operate on data in the database layer, the database layer including a database server having a database to store cluster configuration information, the memory device having a secure store file accessible by a plurality of application server instances of the application layer, each of the plurality of application server instances to retrieve a respective database connection parameter in the secure store file, each of the application server instances further to connect to the database based on the retrieved respective database connection parameter;
   a front-end layer executing with computer hardware to display in a user interface a hierarchical visual representation of the cluster configuration information and a respective connection parameter of one of the application server instances stored in the secure store file, the front-end layer further to receive via the user interface an input identifying the displayed connection parameter and the displayed cluster configuration information, and in response to the received input, the front-end layer further to generate a batch of tasks including a first key-value pair corresponding to the identified connection parameter and a second key-value pair corresponding to the identified configuration information, the first key-value pair including a parameter key to identify the identified connection parameter and a parameter value to specify a value of the identified connection parameter;
   a logic layer of the configuration tool executing with computer hardware to receive the batch of tasks from the front-end layer, the logic layer further to perform the provided batch of tasks, including
      setting a value in the secure store file for the identified connection parameter, and setting a value in the database for the identified configuration information; and wherein the configuration tool is an offline configuration tool configured to operate while the one or more application server instances are not running.

10. The configuration tool of claim 9, wherein the batch of tasks comprises at least one of:
a set database Uniform Resource Locator task to specify a (URL) for connecting to a database; and
a set database password task to specify a password for connecting to the database.

11. The configuration tool of claim 9, wherein the hierarchical visual representation comprises a hierarchical tree structure having one or more tree nodes, each of the one or more tree nodes representing a resource of the plurality of application servers, wherein at least one of the tree nodes represents the secure store file; and
wherein upon selecting the tree node representing the secure store file, a list of one or more secure store properties is displayed in the graphical user interface.

12. The configuration tool of claim 11, wherein each of the one or more listed secure store properties comprises:
a key field to identify a property; and
a value field to specify a current value a the property.

13. An article of manufacture comprising:
an electronically accessible storage medium providing instructions that, when executed by an apparatus, cause the apparatus to
operate a web-based application having a multi-tiered architecture including an application layer and a database layer, the application layer including a plurality of application server instances, the database layer including
a database server having a database to store cluster configuration information providing a central definition of a cluster including the database and the plurality of application server instances, and
a secure store file to store one or more database connection parameters; for each of the plurality of application server instances,
retrieve with the application server instance a respective database connection parameter in the secure store file, and
connect the application server instance to the database based on the retrieved respective database connection parameter;
display in a front-end layer of a configuration tool a hierarchical visual representation of the cluster configuration information and a respective connection parameter of one of the application server instances stored in the secure store file;
receive via the front-end layer of the configuration tool input identifying the displayed connection parameter and the displayed cluster configuration information;
in response to the received input, provide a batch of tasks to a logic layer of the configuration tool, including providing a key-value pair corresponding to the identified connection parameter and a second key-value pair corresponding to the identified configuration information, the first key-value pair including a parameter key to identify the identified connection parameter and a parameter value to specify a value of the identified connection parameter;
perform the provided batch of tasks with the logic layer of the configuration tool, including
setting a value in the secure store file for the identified connection parameter, and
setting a value in the database for the identified configuration information; and
wherein the configuration tool is an offline configuration tool configured to operate while the one or more application server instances are not running.

14. The article of manufacture of claim 13, wherein the hierarchical visual representation includes a hierarchical tree structure having one or more tree nodes, each of the one or more tree nodes representing a resource of the plurality of application servers, wherein at least one of the tree nodes represents the secure store file; and wherein the instructions, when executed by the apparatus, further cause the apparatus to
receive input identifying the displayed secure store tree node.

15. The article of manufacture of claim 14, wherein the instructions that, when executed by the apparatus, cause the apparatus to display the visual representation of one or more connection parameters cause the apparatus to
display the visual representation of one or more connection parameters responsive to receiving input identifying the displayed secure store tree node.

16. The article of manufacture of claim 15, wherein the displayed connection parameters include at least one of:
a database Uniform Resource Locator (URL) property specifying a URL for connecting to a database; and
a database password property specifying a password for connecting to the database.

17. The article of manufacture of claim 16, wherein the instructions that, when executed by the apparatus, cause the apparatus to set the value for the identified connection parameter cause the apparatus to
set the database password property.

* * * * *